A. H. HOLMES.
REPRODUCER FOR TALKING MACHINES.
APPLICATION FILED JAN. 27, 1919.

1,310,753.  Patented July 22, 1919.

WITNESS:

INVENTOR
Arnold H. Holmes
BY
Augustus B. Stoughton.
ATTORNEY.

UNITED STATES PATENT OFFICE.

ARNOLD H. HOLMES, OF PHILADELPHIA, PENNSYLVANIA, ASSIGNOR TO PERFELITONE CORPORATION, OF PHILADELPHIA, PENNSYLVANIA, A CORPORATION OF DELAWARE.

REPRODUCER FOR TALKING-MACHINES.

1,310,753.  Specification of Letters Patent.  Patented July 22, 1919.

Application filed January 27, 1919. Serial No. 273,382.

*To all whom it may concern:*

Be it known that I, ARNOLD H. HOLMES, a citizen of the United States, and a resident of Philadelphia, in the county of Philadelphia and State of Pennsylvania, have invented a certain new and useful Improvement in Reproducers for Talking-Machines, of which the following is a specification.

The principal objects of the present invention are to more clearly re-produce music, or in other words, to improve the articulation of the reproduction; to avoid or greatly reduce the usual disagreeable metallic scratch or noise incident to the reproduction, and to provide for reproducing a record with fidelity to the original and without introducing discordant sounds or noises in the reproduction.

The above objects, as well as others, are accomplished by the avoidance of a metallic connection between the metallic body of the reproducer and the diaphragm, as will be hereinafter more fully described and finally claimed.

The accompanying drawings, forming part hereof, illustrate an embodiment of the invention, and in them—

Figures 1, 2:
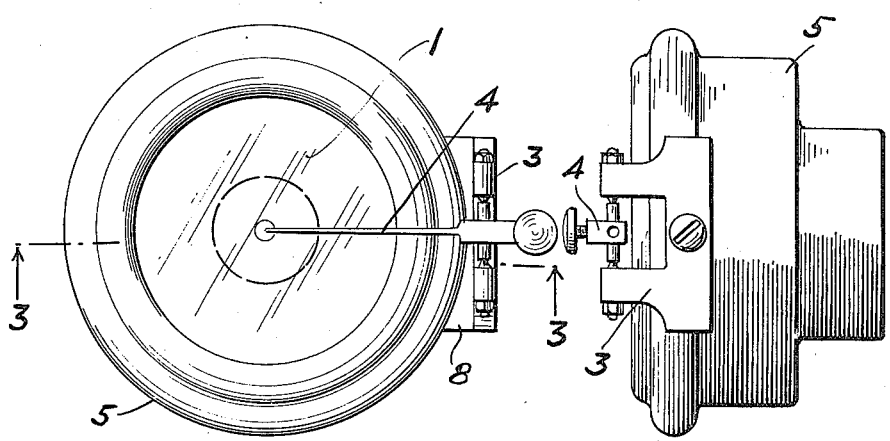
Figure 1, is a front view.
Fig. 2 is a side view.
Figures 3, 4:
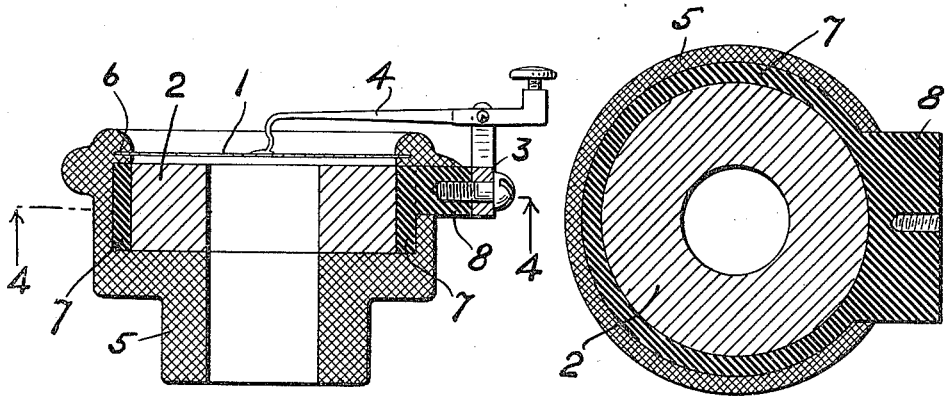
Fig. 3 is a sectional view, on the line 3—3 of Fig. 1.
Fig. 4, is a sectional view on the line 4—4 of Fig. 3.

In the drawings 1 is a diaphragm as of mica, or other appropriate material. 2, is a metallic body in the form of a ring and it supplies the necessary weight. 3, is a stylus arm-pivot fitting which carries the stylus arm 4 that is connected with the diaphragm. These are well known parts of a reproducer. 5, is a housing of soft rubber or rubber material appropriate for supporting the diaphragm 1 at its front in a groove 6. Of course, the term soft rubber is relative, but the meaning is that the word soft is applied in its ordinary sense to rubber and that the housing is of that degree of softness which is adapted to properly support the diaphragm. The housing has a core 7 of relatively hard rubber applied to the body 2 and provided with a hard rubber projection 8, extending through the soft rubber 5 and constituting a support for the fitting 3. The term hard rubber is, of course, relative but it means hard enough to properly support the pivot fitting and the metallic body 2. As shown the fitting is secured to the support by means of a screw and the hard rubber core is shown as encircling the body 2, but it is not essential that in all cases the core should completely encircle the body 2, although I believe that is a good way to construct the device.

The described reproducer or sound box can be made by applying around the metallic body 2 a rubber composition intended to constitute the core and around the core and in rear of the body 2, a rubber composition intended to constitute the soft rubber housing. These compositions are so made that when cured, the one is relatively hard and the other relatively soft, as is well understood by those skilled in the art.

From the foregoing description it is evident that there is no metallic connection between the metallic body 2 and the diaphragm 1, because these two parts have interposed between them a portion of the hard rubber core and by reason of this construction the reproduction is improved and metallic and scratchy sounds are suppressed.

In the drawings the line of demarcation between the soft rubber housing and the hard rubber core is necessarily more pronounced than I believe it to be in the article itself.

The invention is not limited to the precise construction and arrangement illustrated, as it may be embodied in somewhat different forms although I believe the form herein described to be the best one known to me at this time.

What I claim is:

As a new article of manufacture a soft rubber reproducer housing provided with a hard rubber core having a hard rubber extension through the housing which constitutes a stylus arm fitting support.

ARNOLD H. HOLMES.